3,533,134
APPARATUS FOR EXTRUDING TUBES AND PIPES
Harald W. Blomqvist, Gla Vasa, Finland, assignor to Oy Wiik & Hoglund AB, Vasa, Finland
Filed May 12, 1967, Ser. No. 638,109
Claims priority, application Finland, May 23, 1966, 1,349/66
Int. Cl. B29d 23/04
U.S. Cl. 18—14                                                    7 Claims

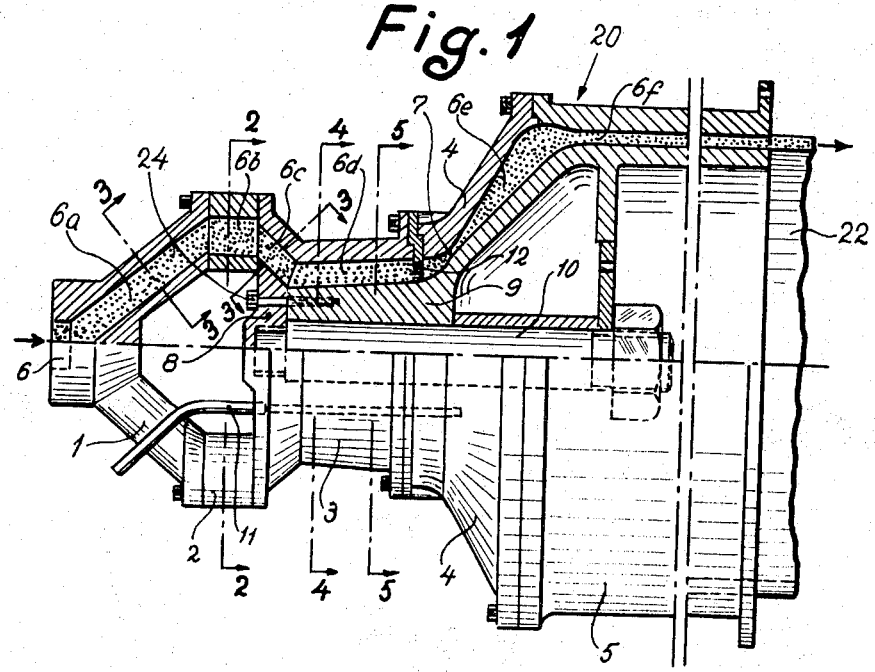
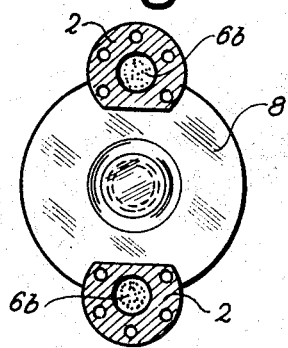
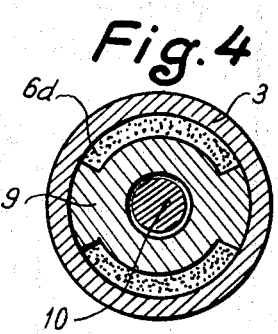
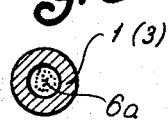
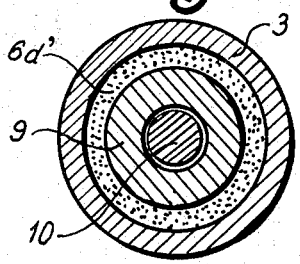
INVENTOR
HARALD BLOMQVIST
ATTORNEYS

United States Patent Office 3,533,134
Patented Oct. 13, 1970

ABSTRACT OF THE DISCLOSURE

A method for extruding tubes and pipes is described herein which includes directing a plasticized material particularly a plastic along at least two separate flow paths which diverge outwardly from a central longitudinal axis; and, while the flow proceeds in a substantially axial direction, expanding the paths circumferentially or peripherally by forming tubular segmental path portions of the flow paths which are permitted to spread outwardly until they are joined circumferentially, and continuing the flow to form a continuous length of the desired diameter and wall thickness.

---

The single embodiment of the apparatus which may be used for carrying out the method of the invention comprises an extruder head which has a central inlet opening and inlet passage which has a central inlet opening and inlet passage which is arranged in association, for example, with an extruder to continuously receive a plasticized material therefrom. The inlet passage is formed in a part which includes divergent passages which extend outwardly in a symmetrical manner from the central longitudinal axis of the inlet passage and of the tube to be formed. The apparatus includes an intermediate part which provides for parallel flow of the plasticized material at two diametrically opposite locations after an initial divergent flow from the inlet. Another connecting part includes connecting passages that permit a slight inward or convergent flow of the two flow paths up to a location at which the plasticized material is permitted to spread out circumferentially in the form of arcuate tubular wall sections. The flow paths on the opposite sides of the longitudinal center line of the tube to be formed is permitted to widen out gradually in the form of tubular wall sectors until the widening is sufficient to cause the two sector portions to join to form a tubular wall configuration of the tube to be extruded. The extuder apparatus includes means for easily connecting and disconnecting the various parts of the head to permit easy disassembly and cleaning of the various passage portions as desired.

SUMMARY OF THE INVENTION

The invention relates in general to a method and an apparatus for extruding tubes and pipes and in particular to a new and useful method and apparatus wherein a tubular configuration is extruded by diverting plasticized material into two separate paths which are permitted to expand into separate tubular sectors or arcs around a central longitudinally extended axis line until the arcs join into a finished tubular configuration.

It has been common to utilize extrusion machines or extruders for the manufacture of bars or other types of plasticizable masses before such use has been made in the plastic industry, for example such apparatus has been well known for years in the rubber industry. Such machines include means for plasticizing the plastic material which is generally fed by means of a screw conveyor and plasticizer toward an outlet orifice which defines the shape of the bar to be formed. In the case of hollow bars the extrusion head is equipped with socalled "torpedo" which defines the shape and dimension of the cavity and which is mounted in the extrusion head and attached on the passage wall by means of arms, for example, so as to form a cross. The torpedo cross which is situated centrally in the passage of the plasticized material being extruded is thus exposed to the forces of considerable magnitude since it has to divide the flowing mass and therefore it must be attached very firmly to the passage wall. The bigger the torpedo, the more firm the attachment must be. In the manufacture of small tubes or medium diameter tubes, there is little difficulty encountered in the construction and arrangement of such torpedoes since they can be dimensioned relatively thin. With thicker tubes, however, considerable difficulties are encountered of which the most important is that the tube walls will not be of uniform thickness but will have considerable irregularities. The irregularities which are produced are such that the plasticized mass cannot be formed into a tube wall of uniform thickness.

In accordance with the present invention this disadvantage is overcome by dividing the plasticized mass which is delivered from the extruder into at least two partial flow paths using an extruder head having flow passages extending outwardly from the central inlet flow passage. The passages define flow paths permitting even distribution of the plasticized material along paths which are permitted to gradually widen in a circumferential direction to form separate tubular portions which are progressively widened sufficiently until the portions are joined into the form of the finished tubular configuration. Experiments have shown that in this manner tubes are formed with more uniform wall thickness than in the case of the socalled "torpedo" equipped extruder head of conventional construction. The result is surprising considering the fact that the torpedo arms also bring forth a division of the mass flow, the division being more pronounced when torpedo arms are of large dimension. It would appear that the undesirable effects of the torpedo arms on the uniformity of the tube walls are probably due to the fact that the partial flows which are produced by the torpedo, rather than being spread out in a peripheral direction, are compressed as the mass in the form of a closed envelope flows toward the converging forward end of the torpedo.

The apparatus of the invention is characterized by an extruder head with a central passage and at least two passages arranged to diverge outwardly from the central passage for conducting the plasticized material through separate flow paths. The flow passages are preferably evenly distributed along the periphery of the extruder head and are of equal dimensions for the purpose of dividing the plasticized mass into equal partial flows. The passages are arranged such that they gradually widen in a curved manner to form ever increasing arcuate sections of the tube walls of the tube to be manufactured. An advantage of the dividing of the flow into separate flow paths, which at certain portions of the length of such paths are wholly independent of each other, is that the apparatus can be firmly secured to the support along a considerable portion of its length which of course is not possible when utilizing the torpedoes equipped with arms or secured only at the rear end.

Accordingly it is an object of the invention to provide an improved method of plasticizing tubes, pipes and the like which comprises directing a plasticized mass through two separate flow paths which are concentrically arranged around the axis of a tubular member to be formed and permitting the plastic material in each flow path to spread outwardly gradually into the form of partial or half elements of the tube to be formed until the two partial elements are joined peripherally into a final tubular product.

A further object of the invention is to provide an extruder head adapted to be used with a plasticizing device for delivering plasticized material to an inlet thereof which includes a plurality of passages which extend outwardly from a central inlet in opposite directions, the passages being arranged concentrically in respect to the axis of the tube to be formed and being such that they widen peripherally until they join on each side in order to define a tubular passage of the configuration of the tubular element to be formed.

A further object of the invention is to provide an extruder head having a plurality of individual parts which are easily assembled together in order to form a plurality of passages which are arranged concentrically around a central axis and which are formed to meet in a continuous tubular configuration at the outlet end thereof, the parts including a construction for throttling and thereafter peripherally enlarging the tubular mass to the desired dimensions.

A further object of the invention is to provide an extruder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial axial sectional and elevational view of an extruder head constructed in accordance with the invention;

FIG. 2 is a section taken along the line 2—2 of FIG. 1;

FIG. 3 is a section taken along the line 3—3 of FIG. 1;

FIG. 4 is a section taken along the line 4—4 of FIG. 1; and

FIG. 5 is a section taken along the line 5—5 of FIG. 1.

DETAILED DESCRIPTION

Referring to the drawings in particular, the invention embodied therein comprises an extruder head generally designated 20 having a first part or inlet member 1 which defines a central inlet passage 6 which is adapted to align with a discharge of an extruder for delivering a plasticized material thereto. The inlet member 1 is joined to an intermediate member 2 which, in turn, is joined to an intermediate member or arcuate forming portion 3. The arcuate forming portion is joined to one end of an enlarging member or dimension fixing member 4 which is connected at its opposite end to a uniform tube forming member 5. The members 1 to 5, together with inner members 8 and 9 in the assembly of the extruder head 20, define two separate flow passages each referred to as 6a, 6b, 6c, 6d, 6e, and 6f. The two passages are concentrically arranged.

As indicated in FIG. 1, the passages 6a, 6a diverge outwardly in a symmetrical manner around the center line of a tube to be eventually formed. The passages 6a, 6a deliver plasticized material in two separate flow paths to the intermediate member 2 for flow through respective passages 6b, 6b which are substantially parallel. The parallel passages 6b, 6b connect to respective diverging passages 6c, 6c of the member 3 which connect at their opposite ends to respective passages 6d, 6d which widen circumferentially as indicated in FIG. 4. The cross section of the passages 6a and 6b can be arbitrarily chosen but preferably they are circular on a constant diameter as indicated in FIGS. 2 and 3. The passages 6c, however, are advantageously made circular as they are shown in the cross-section shown in FIG. 3 which is taken across each of these passages in FIG. 1. However, these passages 6c may also be made such that their height decreases as their width increases in a peripheral or circumferential direction. The passage from 6c through 6d increases continuously until, as indicated in FIG. 5, the ends meet to form an annular plasticized flow path 6d' at which the two flow paths are joined together into a single tubular flow.

At the connection between the members 3 and 4 there is provided a plate 12 having perforations through which the plasticized material is directed. The plate 12 is arranged directly before a narrow throttle passage 7 defined in a passage 6e of the member 4 in order to provide a throttling of the mass and insure a further homogenization thereof.

In the part 4 the passage 6e is such that the plasticized tubular mass is increased in dimension by the outward or divergent flow from the center line of the tube to be formed. This conical passage 6e flows into a cylindrical passage 6f defined within the member 5. The cylindrical passage 6f is of a size and thickness corresponding to the size and thickness of the finished pipe or tube 22 which is pressed out of the end of the head 20.

It should be appreciated that the portion 1 as well as the other portions 2, 3, 4 and 5 may be interchangeable in order, for example, to vary the size or the number of flow passages which are produced. For example the portion 1 may advantageously be divided into more than two partial flow paths which may, for example, be symmetrically arranged around the central inlet axis to connect to a similar number of passages 6b of the part 2 etc.

The interior portions of the passages 6c, 6d, and 6f are formed by the inner members 8 and 9 which are joined together by means of screws or bolt elements 24. In addition, a large centrally positioned bolt 10 extends through the two portions and holds them together. The bolt 10 also serves as an attaching element for means (not shown) which is adapted to rest against the inner surface of the finished tube 22.

The construction of the extruder head 20 is such that the space between the separate passages of the parts 1 and 2 are easily accesible so that the extruder head 20 can be attached to a support base (not shown) along a considerable portion of its length so that firm attachment of the entire apparatus can be readily achieved. The outer surface of the element 8 and a part of the adjacent element 9 together with the inner surface of the part 3 are shaped so that the width of the passage 6c successively increases in a peripheral direction until the two channels unite at some position along the length of the passage 6d.

When the finished tube or pipe has been fed out of the passage 6f, the inside of the tube must be exposed to compressed air during the time required for cooling the tube in order to insure that the tube walls are not pressed inwardly. This pressurized air may be passed through a tube 11 which is arranged such that it will not have any effect on the attachment of the extruder head 20 nor on the mass flow therethrough.

While a specific embodiment of the invention has been shown and described in detail to illustrate the application of the inventive principles, it will be understood that the invention may be embodied otherwise without departing from such principles.

What is claimed is:

1. An extruder device for use in association with means for delivering plasticized material thereto, comprising an extruder head housing having an inlet with a central bore for receiving plasticized material therein and a discharge for discharging a finished tube at the opposite end, at least two first passages extending outwardly from said central through which a partial flow of the material is directed, an intermediate passage connected to each of the respective ends of said first passages and defining a flow path extending inwardly toward the central axis and a further passage connected to the end of each of the intermediate passages each being of a cross section such that it provide for spreading out of the material flowing therethrough into partial annular sectors of the configuration of the wall of the tube to be formed, the sectors of each of said further passages widening in conferential directions toward the corresponding other further passage so that the further passages join to form a continuous single annular passage leading to the outlet of the extruder head.

2. An extruder device according to claim 1, wherein the thickness of each of said further flow passages at a location where said passages join is less than the diameter of each passage.

3. An extruder device according to claim 1, including a throttling throat defined at a location adjacent said outlet and at a location spaced toward said outlet from where said flow passages are joined.

4. An extruder device according to claim 1, including a perforated plate disposed in said further flow passage.

5. An extruder device, according to claim 1, including a first housing portion adjacent said inlet having said two separate first passages therein diverging outwardly from a central inlet passage, a second housing portion joined to said first housing portion having a parallel passage extending substantially parallel to the exis of said head and joining each of said first diverging passages, and a third housing portion connected to said second housing portion and having said intermediate passages and said further passages connecting respective parallel passages of said second housing portion.

6. An extruder device according to claim 5, including a fourth housing member defining an outwardly divergent conical flow path for the joined flow path from said third housing member and terminating at its outer end in a discharge of tubular configuration of the size of the tube to be extruded.

7. An extruder device for use in association with means for delivering plasticized material thereto, comprising an extruder head housing having an inlet, at least two first divergent passages connected to said inlet through which a partial flow of the material is directed, an intermediate passage connected to each divergent passage and defining a flow path extending inwardly and a further passage connected to each of said intermediate passages and each having a cross section such that it provides for a spreading out of the material flow therethrough into partial annular sectors of the configuration of the wall of the tube to be formed, the sectors of each of said further passages widening in conferential directions towards the corresponding other further passage so that the passages join to form a continuous single annular passage leading to the outlet of the extruder head.

References Cited

UNITED STATES PATENTS

| | | | |
|---|---|---|---|
| 3,228,064 | 1/1966 | Plummer | 18—12 |
| 3,234,597 | 2/1966 | Van Peborgh | 18—14 X |
| 3,343,215 | 9/1967 | Vinkeloe | 18—14 |

J. SPENCER OVERHOLSER, Primary Examiner